(12) United States Patent
Kostadinov

(10) Patent No.: US 7,585,012 B2
(45) Date of Patent: Sep. 8, 2009

(54) ADJUSTABLE VEHICLE ROOF

(75) Inventor: Metodi Kostadinov, Stuttgart (DE)

(73) Assignee: Magna Car Top Systems GmbH, Bietigheim-Bissingen (DE)

(*) Notice: Subject to any disclaimer, the term of this patent is extended or adjusted under 35 U.S.C. 154(b) by 0 days.

(21) Appl. No.: 12/250,860

(22) Filed: Oct. 14, 2008

(65) Prior Publication Data

US 2009/0066111 A1   Mar. 12, 2009

Related U.S. Application Data

(62) Division of application No. 11/696,042, filed on Apr. 3, 2007, now Pat. No. 7,455,346.

(30) Foreign Application Priority Data

Apr. 7, 2006   (DE) .................. 10 2006 016 853

(51) Int. Cl.
*B60J 7/00* (2006.01)
(52) U.S. Cl. ..................... 296/107.01; 296/107.16; 296/107.17
(58) Field of Classification Search ............ 296/107.01, 296/117, 107.11, 107.08, 107.16
See application file for complete search history.

(56) References Cited

U.S. PATENT DOCUMENTS

| | | | |
|---|---|---|---|
| 4,351,555 A | 9/1982 | Hashimoto | |
| 4,489,660 A | 12/1984 | Tamamushi | |
| 5,542,735 A | 8/1996 | Furst et al. | |
| 5,746,470 A | 5/1998 | Seel et al. | |
| 5,971,470 A * | 10/1999 | May et al. ............... | 296/107.16 |
| 6,010,178 A | 1/2000 | Hahn et al. | |
| 6,334,644 B1 | 1/2002 | Gurtler et al. | |
| 6,336,673 B1 * | 1/2002 | Rothe et al. ............ | 296/107.17 |
| 6,454,343 B1 | 9/2002 | Wagner et al. | |
| 6,502,891 B2 | 1/2003 | Russke | |
| 6,604,775 B2 | 8/2003 | Obendiek | |
| 6,695,386 B1 | 2/2004 | Willard | |
| 6,837,533 B2 * | 1/2005 | Wojciech et al. ....... | 296/107.17 |
| 6,857,686 B2 | 2/2005 | Willard | |
| 6,866,325 B2 * | 3/2005 | Willard ................. | 296/107.16 |
| 6,866,327 B2 | 3/2005 | Willard | |

(Continued)

FOREIGN PATENT DOCUMENTS

DE        196 13 917        10/1997

(Continued)

*Primary Examiner*—Kiran B. Patel
(74) *Attorney, Agent, or Firm*—Brooks & Kushman P.C.

(57) ABSTRACT

A vehicle includes a compartment, roof, roof system, cover, cover link, and coupling system. The roof is movable between a closed position and a storage position in which the roof is within the compartment. The roof system has a main link movably coupled to the vehicle via a joint and connected to the roof to move the roof. The cover is movable between a closed position covering the compartment and an opened position raised from the compartment. The cover link is movably coupled to the vehicle via a joint and connected to the cover to move the cover. The coupling system has a connecting link coupling the links such that the cover is coupled to the roof system to move about the cover link joint as the roof moves. The connecting link passes through a position in which it and the joints run along a straight line during roof movement.

11 Claims, 13 Drawing Sheets

U.S. PATENT DOCUMENTS

| | | |
|---|---|---|
| 6,962,386 B2 | 11/2005 | Hesse |
| 6,983,976 B2 | 1/2006 | Reinsch |
| 7,063,371 B2 * | 6/2006 | Willard ................. 296/107.17 |
| 7,140,666 B2 | 11/2006 | Wulf et al. |
| 7,172,235 B2 | 2/2007 | Rosler et al. |
| 2003/0020300 A1 | 1/2003 | Zipperle |
| 2003/0042751 A1 * | 3/2003 | Antreich ................ 296/107.17 |
| 2004/0262942 A1 * | 12/2004 | Willard ................. 296/107.12 |
| 2005/0012356 A1 | 1/2005 | Hesse |
| 2006/0125282 A1 * | 6/2006 | Theuerkauf ............ 296/107.07 |
| 2007/0182196 A1 | 8/2007 | Roder |
| 2008/0061589 A1 * | 3/2008 | Froschle et al. ........ 296/107.11 |

FOREIGN PATENT DOCUMENTS

| | | |
|---|---|---|
| DE | 101 17 767 | 10/2002 |
| DE | 103 31 987 | 2/2005 |
| EP | 1 034 979 | 9/2000 |

* cited by examiner

ADJUSTABLE VEHICLE ROOF

CROSS-REFERENCE TO RELATED APPLICATIONS

This application is a divisional of U.S. application Ser. No. 11/696,042, filed Apr. 3, 2007, now U.S. Pat. No. 7,455,346, which claims foreign priority benefits under 35 U.S.C. § 119(a)-(d) to DE 10 2006 016 853.4, filed Apr. 7, 2006, which are hereby incorporated by reference in their entirety.

BACKGROUND OF THE INVENTION

1. Field of the Invention

The present invention relates to a convertible vehicle having a roof kinematic system which movably couples a roof to the vehicle body to be movable between a closed position in which the roof extends over and covers the vehicle interior and a storage position in which the roof is lowered into and stored within a storage compartment of the vehicle.

2. Background Art

DE 103 31 987 A1 (corresponds to U.S. Pat. No. 6,962, 386) describes a convertible vehicle having a multiple part roof. A roof kinematic system moves the roof between a closed position in which the roof parts extend over and cover the vehicle interior and a storage position in which the roof parts are lowered into and stored within a storage compartment of the vehicle. A cover is movably connected to the vehicle to open and close the compartment. The cover is lowered to close the compartment with the roof stored therein. The cover is raised to provide access for the roof to be moved into and out of the compartment. The cover is kinematically connected, through a connecting link and a transfer link, with a main link of the roof kinematic system. The connecting and transfer links form a kinematic chain such that movement of the main link about its vehicle body-side joint transfers movement to the cover and the cover is raised about its vehicle body-side joint. The cover has along its side edges, extending in the longitudinal direction of the vehicle, a guide slot in which a pin of the connecting link is slidably supported. As an actuator moves the roof kinematic system, the connecting link swivels about a vehicle body-side joint and the pin is guided along in the guide slot on the cover thereby raising the cover. The transfer of movement from the roof kinematic system through the coupling kinematic system to the cover presumes a sliding block guide in the side area of the cover.

DE 101 17 767 A1 describes a cover kinematically coupled to the roof kinematic system. The cover functions as a rear parcel shelf that extends within the vehicle interior beneath the rear roof part when the roof is in the closed position. A coupling kinematic system couples the cover to the roof kinematic system. The coupling kinematic system is an over-center kinematic system which crosses a dead-center position when the roof moves between its closed and storage positions, after which the swinging up movement of the cover to open a passage into the compartment reverses and the cover is closed again. However, the coupling kinematic system is complicated, having six links which control the movement of the cover. At first, the swinging movement of the main link of the roof kinematic system is transferred through a torsionally rigid lever to another intermediate lever, which makes a swinging connection with a body-mounted coupling lever, which in turn is articulately connected to a transfer lever of the cover link. Moreover, a body-mounted control lever makes a swinging connection with the transfer lever of the cover link.

SUMMARY OF THE INVENTION

An object of the present invention is using simple measures to kinematically couple the movement of a storage compartment cover to the movement of a roof of a convertible vehicle as the roof moves between closed and storage positions.

In carrying out the above object and other objects, the present invention provides a vehicle having a compartment, a roof, a roof kinematic system, a cover, a cover link, and a coupling kinematic system. The roof has a plurality of roof parts and is movable between a closed position in which the roof parts extend over the vehicle interior and a storage position in which the roof parts are stored within the compartment. The roof kinematic system has a main link movably coupled to the vehicle body via a vehicle body-side joint and connected to at least one of the roof parts to move the roof between the closed and storage roof positions. The cover is movable between a closed position in which the cover covers the compartment and an opened position in which the cover is raised from the compartment. The cover link is movably coupled to the vehicle body via a vehicle body-side joint and connected to the cover to move the cover between the closed and opened cover positions. The coupling kinematic system has a connecting link coupling the main link of the roof kinematic system to the cover link such that the cover is coupled to the roof kinematic system to move about the vehicle body-side joint of the cover link as the roof moves between the closed and storage roof positions. The connecting link passes through a lined-up position in which the connecting link and the vehicle body-side joints of the main link and the cover link run along a straight line during movement of the roof between the closed and storage roof positions.

Further, in carrying out the above object and other objects, the present invention provides a roof assembly for a vehicle having a compartment and a cover movable between a closed position in which the cover covers the compartment and an opened position in which the cover is raised from the compartment. The roof assembly includes a roof, a roof kinematic system, a cover link, and a coupling kinematic system. The roof has a plurality of roof parts. The roof is movable between a closed position in which the roof parts extend over the vehicle interior and a storage position in which the roof parts are stored within the compartment. The roof kinematic system has a main link movably coupled to the vehicle body via a vehicle body-side joint and connected to at least one of the roof parts to move the roof between the closed and storage roof positions. The cover link is movably coupled to the vehicle body via a vehicle body-side joint and connected to the cover to move the cover between the closed and opened cover positions. The coupling kinematic system has a connecting link coupling the main link of the roof kinematic system to the cover link such that the cover is coupled to the roof kinematic system to move about the vehicle body-side joint of the cover link as the roof moves between the closed and storage roof positions. The connecting link passes through a lined-up position in which the connecting link and the vehicle body-side joints of the main link and the cover link run along a straight line during movement of the roof between the closed and storage roof positions.

In an embodiment of the present invention, the coupling kinematic system through which the movement of the roof kinematic system is transferred to the cover exclusively consists of links that are connected to one another or with the roof kinematic system and the cover through joints. This transmission path between the roof kinematic system and the cover has a maximum of three links including a connecting link. The connecting link is directly pivotably coupled to the cover and is a component of the coupling kinematic system. The connecting link passes through a lined-up or dead-center position in which the connecting link and the vehicle body-side joints of the roof kinematic system and the cover link (i.e., the cover kinematic system) form a straight line when the roof moves between its closed and storage positions.

This embodiment has various advantages. First, it is possible to build small kinematic systems as the use of exclusively rotatable links means that only relatively little space is required and relatively little movement space is required for the coupling kinematic system. Translational displacements, which require more space and/or elaborate sliding block guides are unnecessary. Second, rotational coupling of the links among one another and/or with the cover and/or the roof kinematic system simplifies the structure over prior-art designs.

In an embodiment of the present invention, the coupling kinematic system includes the connecting link. The connecting link makes a pivoting connection with the cover through a joint at one end and makes a pivoting connection through another joint at the other end with a component of the roof kinematic system. For instance, the component of the roof kinematic system is a main link of the roof kinematic system. This embodiment represents a simple construction having a minimum number of moving components.

In an embodiment of the present invention, the coupling kinematic system includes a coupling link in addition to the connecting link. One end of the coupling link makes a pivoting connection with the connecting link. The other end of the connecting link makes a pivoting connection with a component (such as the main link) of the roof kinematic system. For an unambiguously determined transfer of movement it can be advantageous to support the coupling link on a vehicle body-side joint, for example by a support link, or to mount the coupling link itself directly through a vehicle body-side joint.

In an embodiment of the present invention, the link of the coupling kinematic system that is coupled to the roof kinematic system advantageously acts on the roof kinematic system at a distance from the vehicle body-side joint of the main link so that the lever motion between the body-mounted axis of rotation of the main link and the joint to the coupling kinematic system functions as a control movement for the cover. It is advantageous for the connection or coupling link of the coupling kinematic system to act directly on the main link of the roof kinematic system. Alternatively it is also possible to connect the coupling kinematic system through another lever or link of the roof kinematic system.

The above features, and other features and advantages of the present invention as readily apparent from the following detailed descriptions thereof when taken in connection with the accompanying drawings.

DETAILED DESCRIPTION OF THE PREFERRED EMBODIMENT(S)

Figure 1:
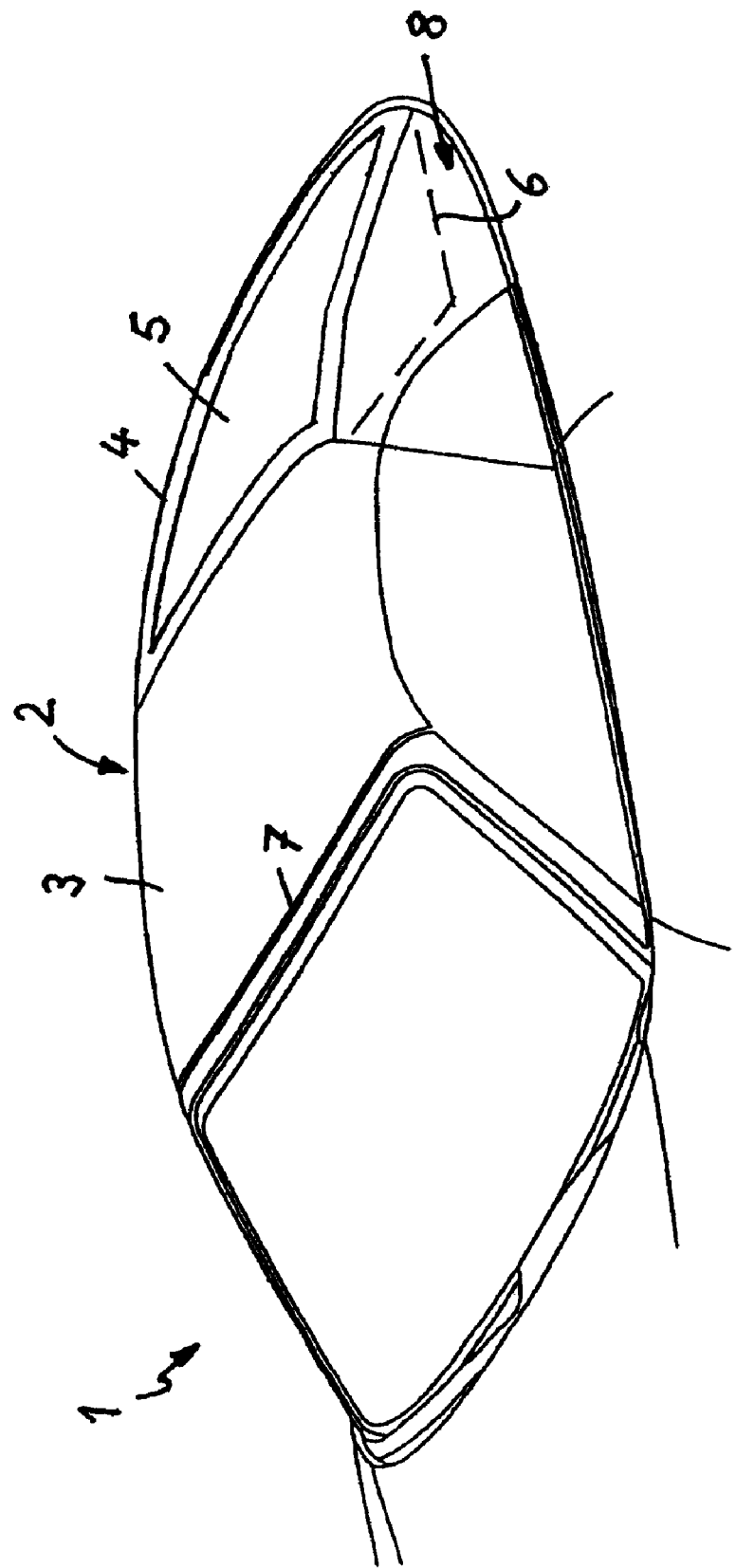
FIG. 1 illustrates a perspective view of a roof having front and rear roof parts in accordance with an embodiment of the present invention in which the roof is movable between a closed position shown in FIG. 1 in which the roof parts extend over and cover the interior of a vehicle and a storage position in which the roof parts are folded together, lowered, and stored in a storage compartment of the vehicle with a movable cover covering the compartment.

The figures denote like components by the same reference numerals.

Referring now to FIG. 1, a perspective view of a roof 2 having rigid front and rear roof parts 3, 4 in accordance with an embodiment of the present invention is shown. Roof 2 is movable between a closed position shown in FIG. 1 in which roof parts 3, 4 extend over and cover the interior of a convertible vehicle 1 and a storage position in which roof parts 3, 4 are folded together, lowered, and stored in a storage compartment 8 of vehicle 2. A movable cover 6 covers compartment 8. Rear roof part 4 includes a rear window 5. In the closed position of roof 2 as shown in FIG. 1, front roof part 3 borders a windshield frame 7 of vehicle 1.

In this embodiment, roof 2 is a hardtop roof having two roof parts. In other embodiments, roof 2 may be a soft top with a cloth stretched over a frame assembly and/or roof 2 may have more than two roof parts.

Storage compartment 8 of vehicle 1 holds roof parts 3, 4 therein when roof 2 is in its stored position. Cover 6 is movably connected to the vehicle body so as to swing through a vehicle body-side joint to open and close relative to the top side of compartment 8. In its closed position, cover 6 extends horizontally over compartment 8 and closes off compartment 8. In its opened position, cover 6 is swung up from compartment 8 to allow access into and out of compartment 8. As such, cover 6 is moved from its closed position to its opened position to allow roof parts 3, 4 to move into and out from compartment 8 when roof is moving between its closed and storage positions. After roof 2 is stored in compartment 8, cover 6 is moved back from its opened position to its closed position. In its closed position, cover 6 lies beneath rear roof part 4 within the interior of vehicle 1. Cover 6 functions as a rear parcel shelf that extends within the vehicle interior beneath rear roof part 4 when roof 2 is in its closed position.

Figure 2:
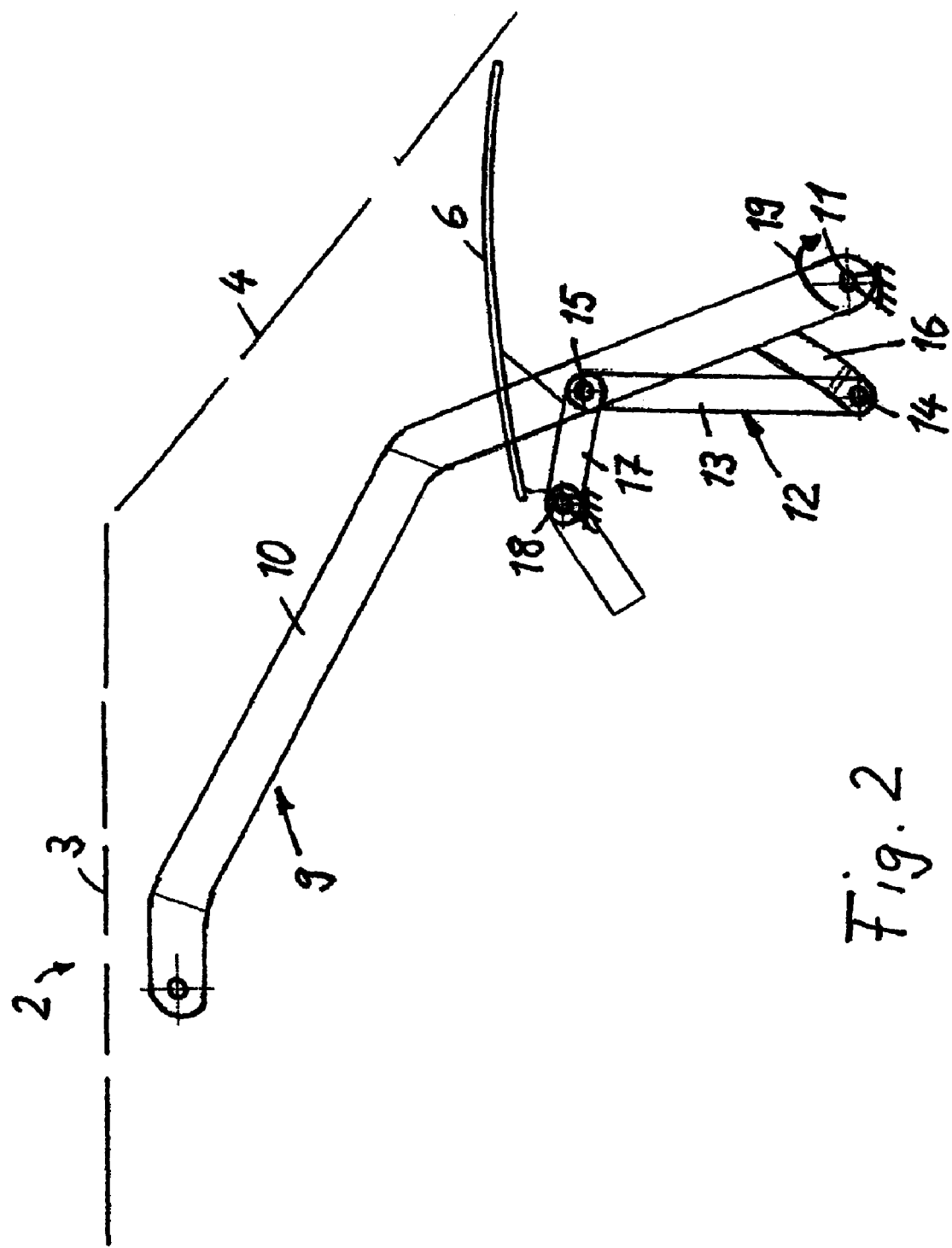
FIG. 2 illustrates a side view of a roof kinematic system for moving the roof between its closed and storage positions, a cover link kinematic system for moving the cover between a cover position in which the cover covers the compartment and an opened position in which the cover uncovers the compartment, and a coupling kinematic system which kinematically couples the roof and cover kinematic systems in which the roof and the cover are in their respective closed positions.
Figure 3:
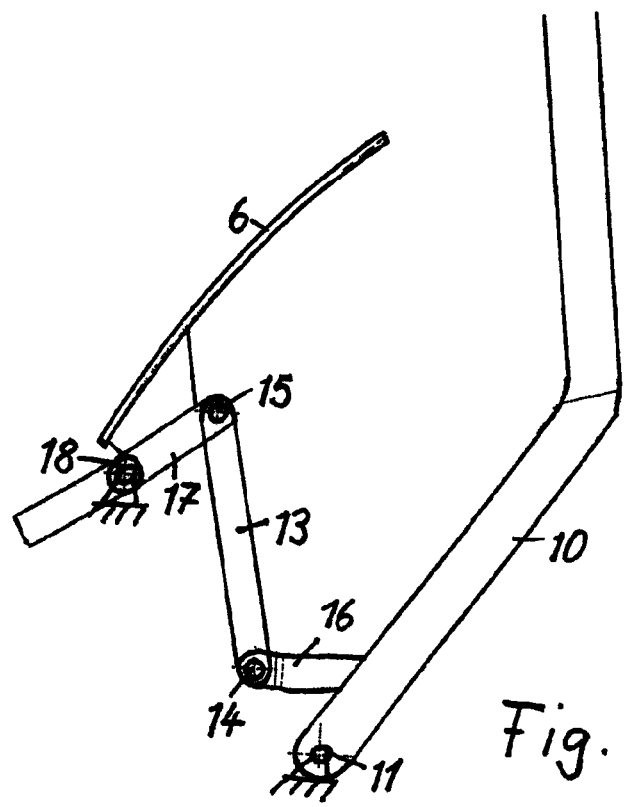
FIG. 3 illustrates a side view of the kinematic systems when the roof is beginning to move from its closed position to its storage position with the cover swung open towards its opened position.
Figure 4:
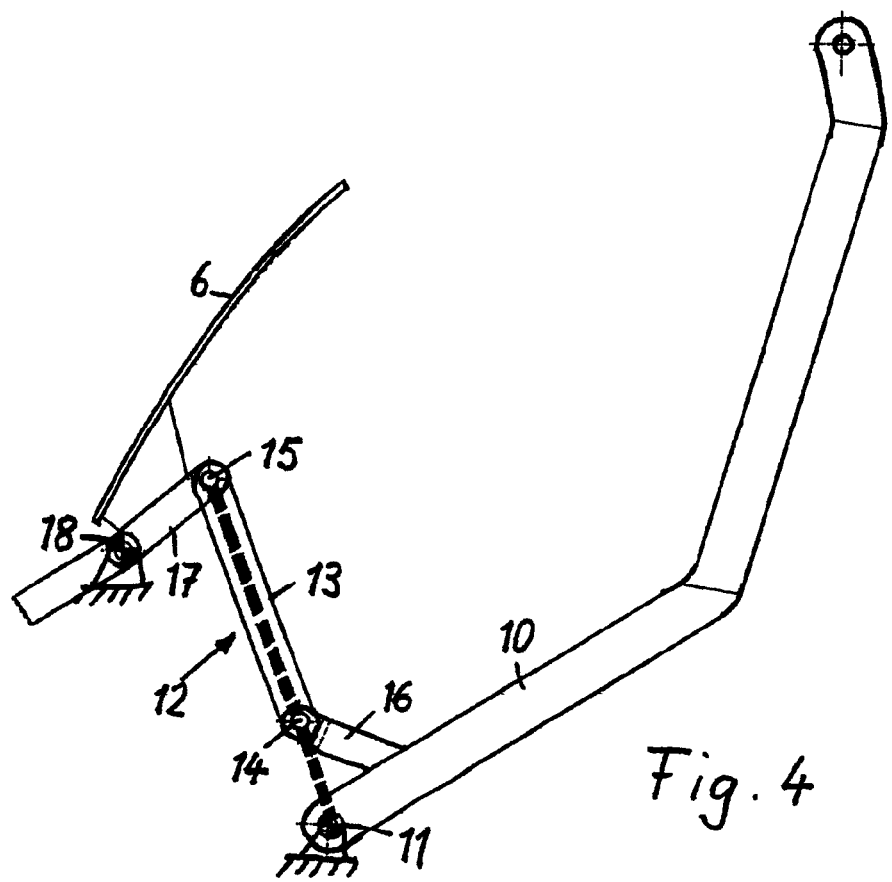
FIG. 4 illustrates a side view of the kinematic systems when the roof is further advanced towards its storage position with the joints of a connecting link of the coupling kinematic system and a vehicle body-side joint of a main link of the roof kinematic system being lined up.
Figure 5:
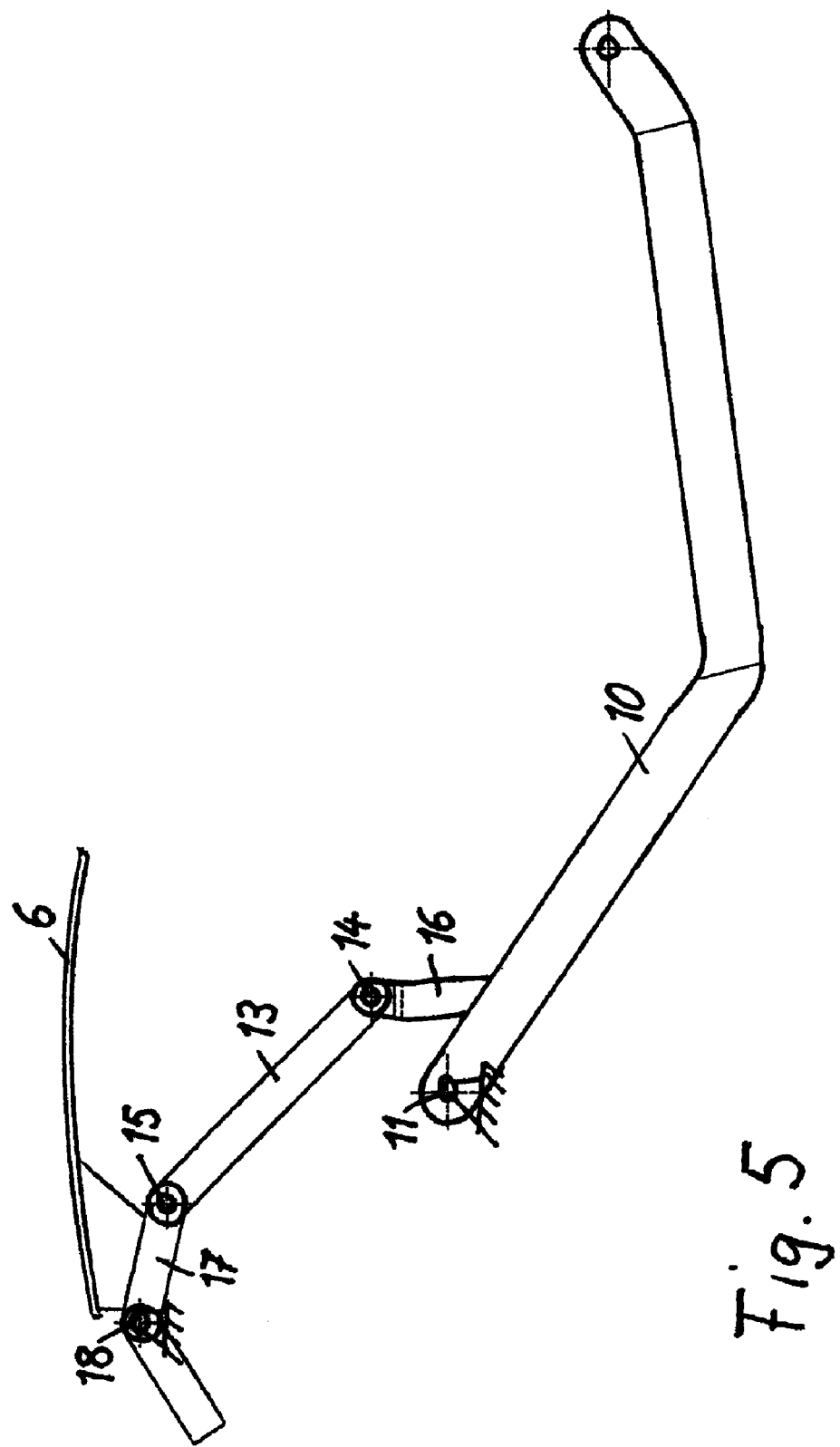
FIG. 5 illustrates a side view of the kinematic systems when the roof is in its storage position with the main link of the roof kinematic system also being stored in the compartment and the cover being in its closed position covering the compartment.

Referring now to FIGS. 2, 3, 4, and 5, an embodiment of a roof kinematic system 9 for moving roof 2 between its closed and storage positions, a cover kinematic system 17 for moving cover 6 between its closed and opened positions, and a coupling kinematic system 12 which kinematically couples roof kinematic system 9 and cover kinematic system 17 together is shown. FIG. 2 illustrates a side view of kinematic systems 9, 17, and 12 when roof 2 and cover 6 are in their respective closed positions. FIG. 3 illustrates a side view of kinematic systems 9, 17, and 12 when roof 2 is beginning to move from its closed position to its storage position with cover 6 swung open towards its opened position. FIG. 4 illustrates a side view of kinematic systems 9, 17, and 12 when roof 2 is further advanced towards its storage position with joints 14, 15 of a connecting link 13 of coupling kinematic system 12 and a vehicle body-side joint 11 of a main link 10 of roof kinematic system 9 being lined up. FIG. 5 illustrates a side view of kinematic systems 9, 17, and 12 when roof 2 is in its storage position with main link 10 of roof kinematic system 9 also being stored in compartment 8 and cover 6 being in its closed position covering compartment 8.

Roof kinematic system 9 is coupled to at least one of roof parts 3, 4 to move roof 2 between its closed and storage positions. Main link 10 of roof kinematic system 9 is pivotably attached to the vehicle body via vehicle body-side joint 11. Main link 10 swings about the axis of rotation of joint 11 back toward the rear of vehicle 1 as shown by the direction of arrow 19 in FIG. 2 into compartment 8 in order to move roof 2 from its closed position (shown in FIG. 2) to its storage position (shown in FIG. 5). Cover 6 swings up from compartment 8 in the opposite direction of main link 10 in order to enable roof 2 and main link 10 to move into compartment 8.

Cover kinematic system 17 is a cover link 17 which is coupled to cover 6. Cover link 17 is pivotably coupled to the vehicle body via a vehicle body-side joint 18.

Coupling kinematic system 12 is between roof kinematic system 9 and cover kinematic system 17 (i.e., cover link 17). Coupling kinematic system 12 couples the movement of cover link 17 to the movement of roof kinematic system 9. In this embodiment, coupling kinematic system 12 includes only connecting link 13. One end of connecting link 13 is connected through a joint 14 that can pivot on a projection 16 of main link 10. The other end of connecting link 13 is pivotably connected with cover link 17 through another joint 15. Connecting link 13 does not undergo any other movements. Main link projection 16 is connected to the main section of main link 10. Joint 14 between main link projection 16 and connecting link 13 is arranged at a distance from vehicle body-side joint 11 of main link 10. The connection through coupling kinematic system 12 moves cover 6 in a kinematically unambiguous manner as a function of the movement of roof 2. The movement of roof 2 is produced through a swinging movement of roof kinematic system 9. As such, the connection through coupling kinematic system 12 moves cover 6 in a kinematically unambiguous manner as a function of movement of roof kinematic system 9.

In this embodiment, the axes of rotation are arranged parallel to one another and run in the transverse direction of vehicle 1. Viewed in the vertical direction and forward direction of vehicle 1, vehicle body-side joint 11 of main link 10 of roof kinematic system 9 lies beneath and behind vehicle body-side joint 18 of cover link 17.

FIG. 3 illustrates kinematic systems 9, 17, and 12 in a first intermediate position as roof 2 moves from its closed position to its storage position. Main link 10 of roof kinematic system has already swung a little toward the back, in the direction of the storage position, and at the same time cover 6 has been moved about its vehicle body-side joint 18 into a swung-up position. The swinging movements of main link 10 and cover 6 are oriented opposite to one another. The swinging of cover 6 creates space for the storage movement of roof 2 and opens a passage into compartment 8. Cover 6 at least partly covers the opening of compartment 8 when roof 2 is in either of its closed or storage positions.

FIG. 4 shows coupling kinematic system 12 in a lined-up or dead-center position. In this lined-up position, two end joints 14, 15 of connecting link 13 lie in a line with vehicle body-side joint 11 of main link 10. The lined-up position is the position in which cover 6 is swung into its furthest opened position. Once the lined-up position is passed, the movement of cover 6 is reversed and cover 6 is once again swung back in the direction of its closed position. This closing movement of cover 6 being in the same direction as the storage movement of roof kinematic system 9 and roof parts 3, 4.

In FIG. 5, the storage position of roof 2 has been reached in which roof 2 and main link 10 are stored in compartment 8. Cover 6 has once again reached its horizontal closed position covering the top side of compartment 8. This position of cover 6 may coincide or slightly differ from the starting closed position of cover 6 which is associated with the closed position of roof 2.

Figure 6:
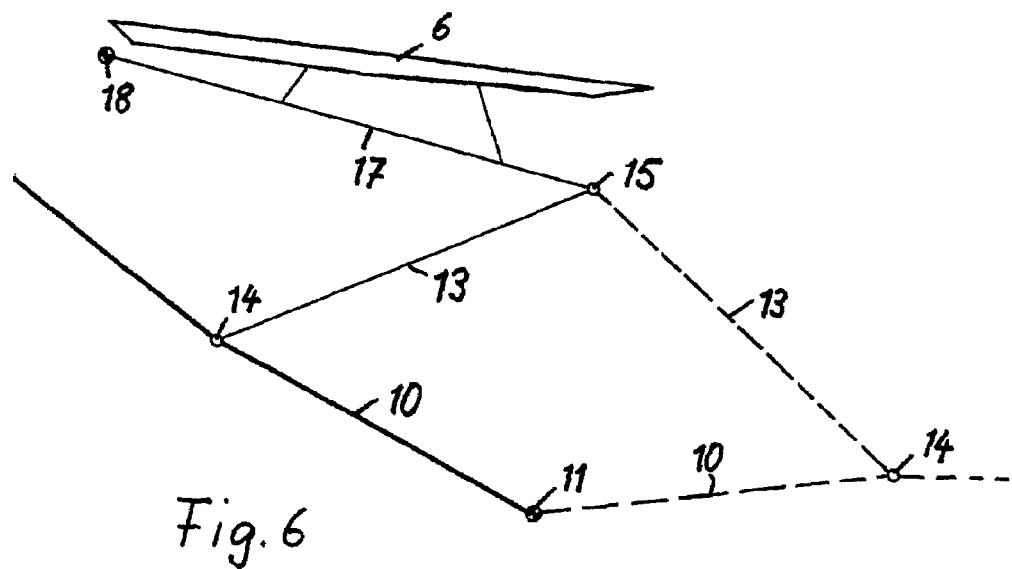
FIG. 6 illustrates a schematic of the cover and the kinematic systems when the roof is in its closed position (indicated by solid lines) and when the roof is in its storage position (indicated by dashed lines) with the cover being in the same closed position in both situations.
Figure 7:
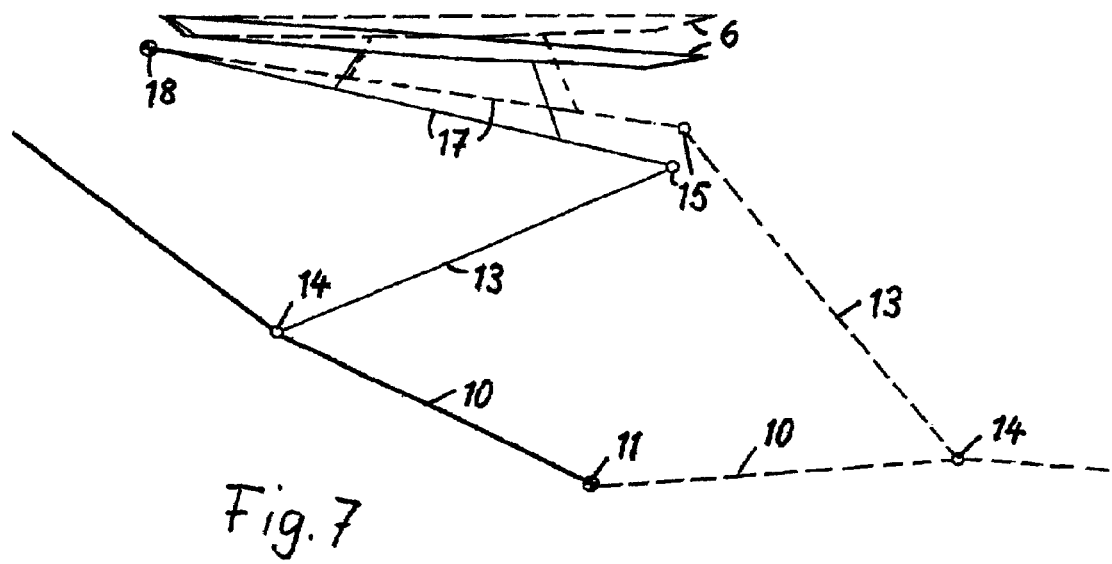
FIG. 7 illustrates a schematic of the cover and the kinematic systems when the roof is in its closed position (indicated by solid lines) and when the roof is in its storage position (indicated by dashed lines) with the cover being in a vertically lower closed position when the roof is in its closed position than when the roof is in its storage position.
Figure 8:
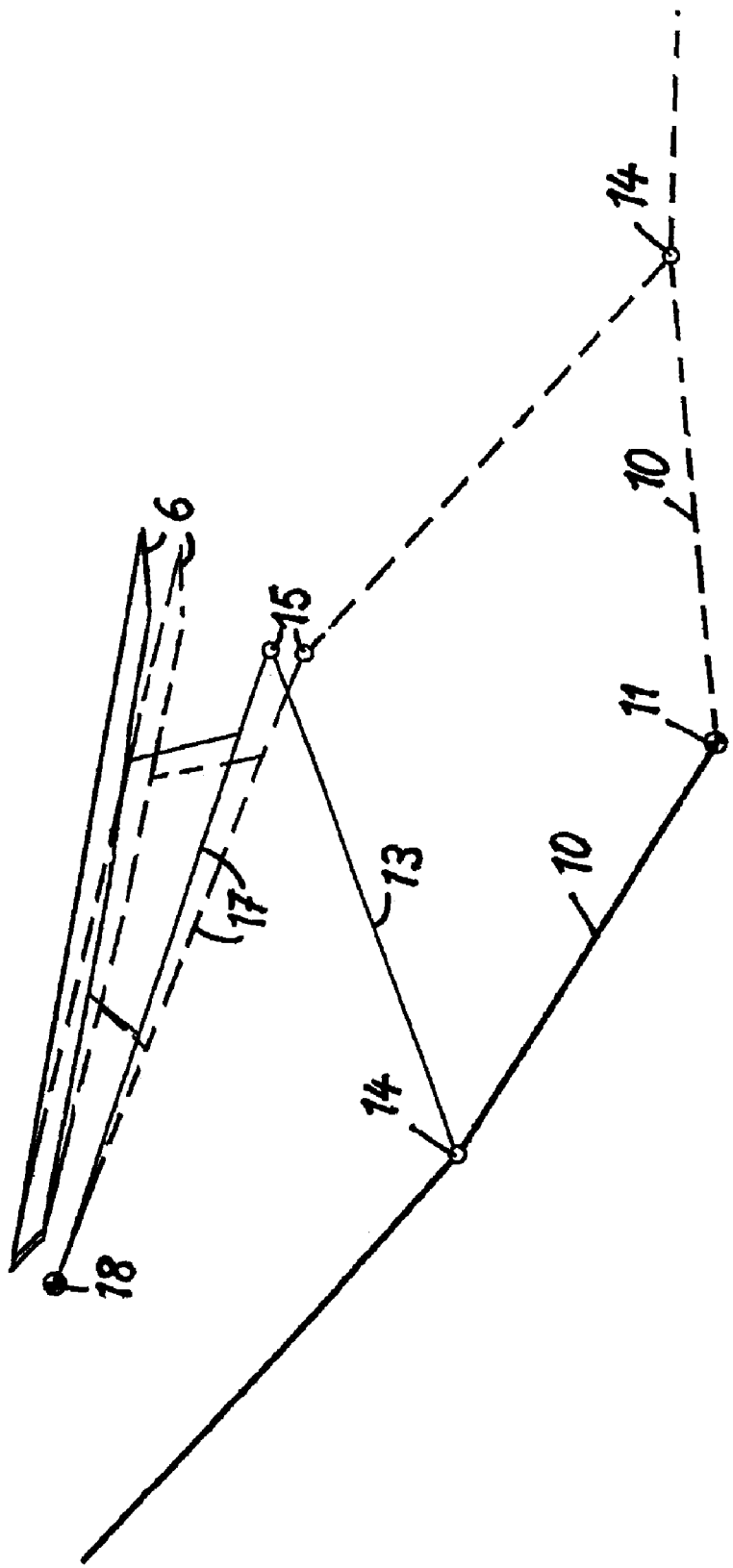
FIG. 8 illustrates a schematic of the cover and the kinematic systems when the roof is in its closed position (indicated by solid lines) and when the roof is in its storage position (indicated by dashed lines) with the cover being in a vertically higher closed position when the roof is in its closed position than when the roof is in its storage position.

Referring now to FIGS. 6, 7, and 8, various situations in which cover 6 is found when roof 2 is in its closed and stored positions are shown. Cover 6 is indicated by a solid line when roof 2 is in its closed position. Cover 6 is indicated by a dashed line when roof 2 is in its storage position.

More particularly, FIG. 6 illustrates a schematic of cover 6 and roof kinematic system 9, coupling kinematic system 9, and cover kinematic system 17 when roof 2 is in its closed position (indicated by solid lines) and when roof 2 is in its storage position (indicated by dashed lines) with cover 6 being in the same closed position in both situations. FIG. 7 illustrates a schematic of cover 6 and kinematic systems 9, 12, and 17 when roof 2 is in its closed position (indicated by solid lines) and when roof 2 is in its storage position (indicated by dashed lines) with cover 6 being in a vertically lower closed position when roof 2 is in its closed position than when roof 2 is in its storage position. FIG. 8 illustrates a schematic of cover 6 and kinematic systems 9, 12, and 17 when roof 2 is in its closed position (indicated by solid lines) and when roof 2 is in its storage position (indicated by dashed lines) with cover 6 being in a vertically higher closed position when roof 2 is in its closed position than when roof 2 is in its storage position.

As such, FIG. 6 shows an embodiment in which cover 6 assumes the same position when roof 2 is in either of the closed and storage positions. By contrast, the embodiment shown in FIG. 7 provides that when roof 2 is in its storage position, cover 6 is in a position above that which is associated with the closed position of roof 2. FIG. 8 shows the reverse: when roof 2 is in its storage position, cover 6 lies in a position beneath that which is associated with the closed position of roof 2.

Figure 9:
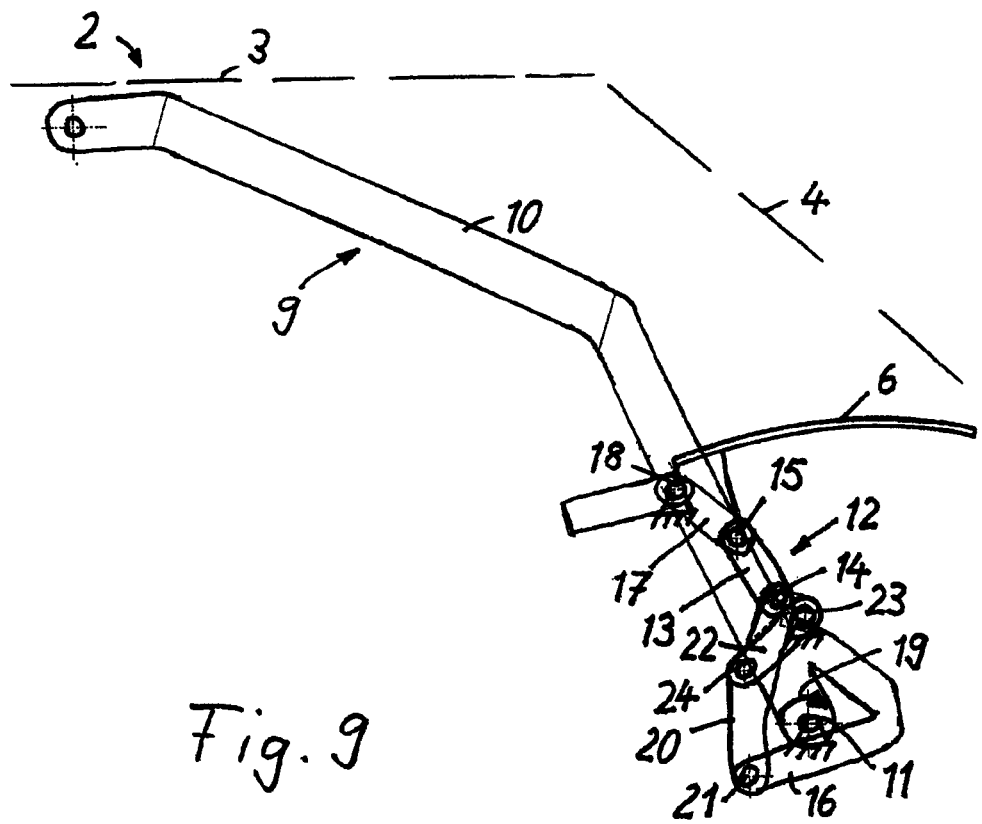
FIGS. 9, 10, 11, 12, and 13 illustrate side views of the roof having another embodiment of the coupling kinematic system in accordance with the present invention in which the coupling kinematic system has three pivoting links shown between the closed position of the roof (shown in FIG. 9) and the storage position of the roof (shown in FIG. 13)
Figure 10:
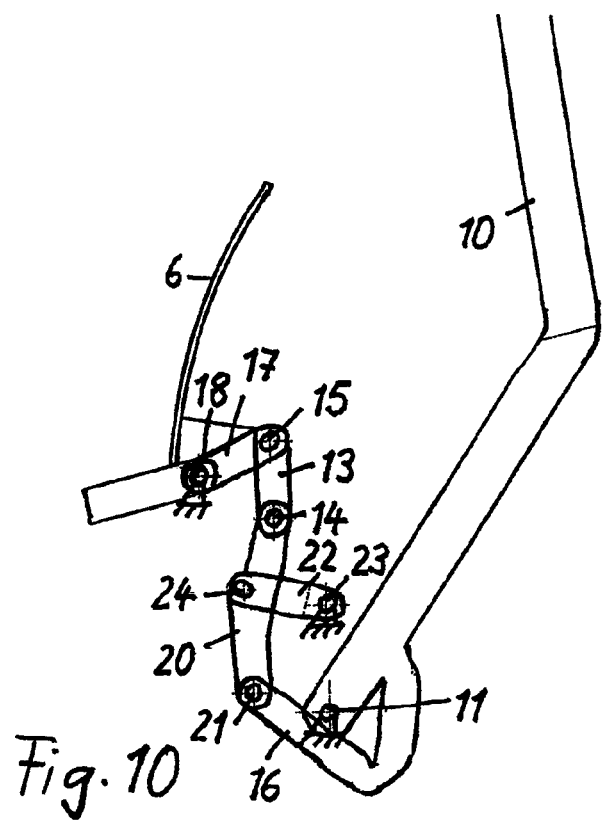
Figure 13:
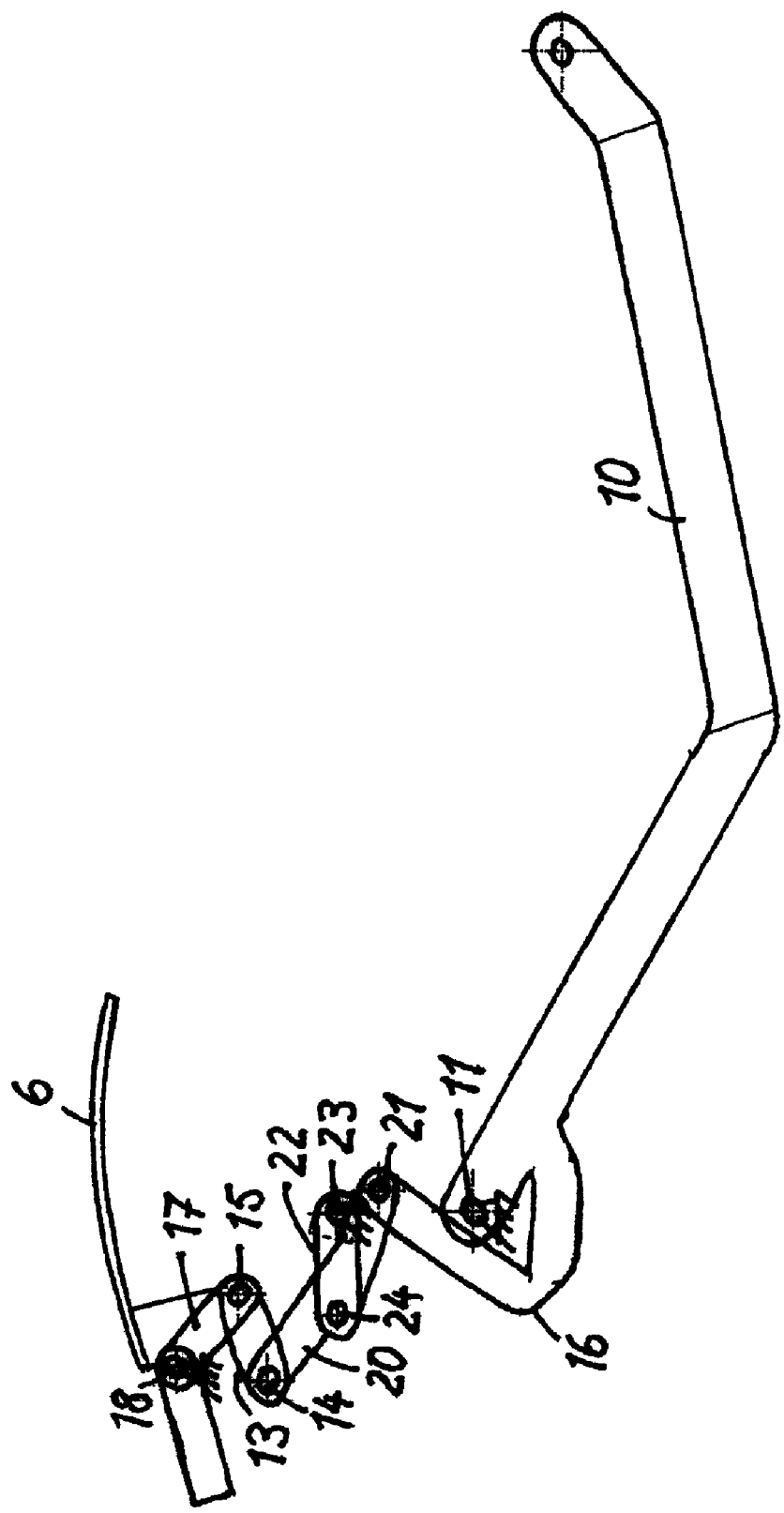

Referring now to FIGS. 9, 10, 11, 12, and 13, side views of roof 2 having another embodiment of coupling kinematic system 12 through which the movement of main link 10 of roof kinematic system 9 is transferred to cover 6 in accordance with the present invention are shown. FIG. 9 illustrates roof kinematic system 9, coupling kinematic system 12, and cover kinematic system 17 when roof 2 is in its closed position. FIG. 13 illustrates kinematic systems 9, 12, and 17 when roof 2 is in its storage position.

In this embodiment, coupling kinematic system 12 includes three pivoting links. In particular, coupling kinematic system 12 includes a coupling link 20 and a support link 22 in addition to connecting link 13. The advantage of this embodiment, with coupling kinematic system 12 having three links between roof kinematic system 9 and cover kinematic system 17 (i.e., cover link 17), which can pivot about body-side joint 18, is that it allows greater geometric freedom with respect to the choice of the links' pivot points.

FIG. 9 illustrates roof 2 in its closed position in which cover 6 is in a horizontal starting position directly beneath rear roof part 4. Main link 10 swings about vehicle body-side joint 11 toward the back when roof kinematic system 9 actuates, as is indicated in FIG. 9 by the direction of arrow 19, automatically causing coupling kinematic system 12 to move cover 6 into an upright position. This movement is kinematically unambiguous without extra degrees of freedom. Connecting link 13 acts on cover link 17 through joint 15 to adjust cover 6, which is coupled to cover link 17, through vehicle body-side joint 18 into a swung-up position (shown in FIGS. 10, 11, and 12). The upright swinging movement of cover 6 about vehicle body-side joint 18 is in the direction opposite the storage movement of main link 10 of roof kinematic system 9.

On the side opposite of cover link 17, connecting link 13 is rotatably connected through joint 14 with coupling link 20. Coupling link 20 is rotatably coupled on the opposite face through another joint 21 so that it can pivot with main link projection 16. To bind extra degrees of freedom of movement, coupling link 20 is supported with respect to the vehicle body through support link 22. One end of support link 22 is pivotably connected through joint 24 with coupling link 20. The other end of support link 22 is pivotably attached through a vehicle body-side joint 23 to the vehicle body.

Figure 11:
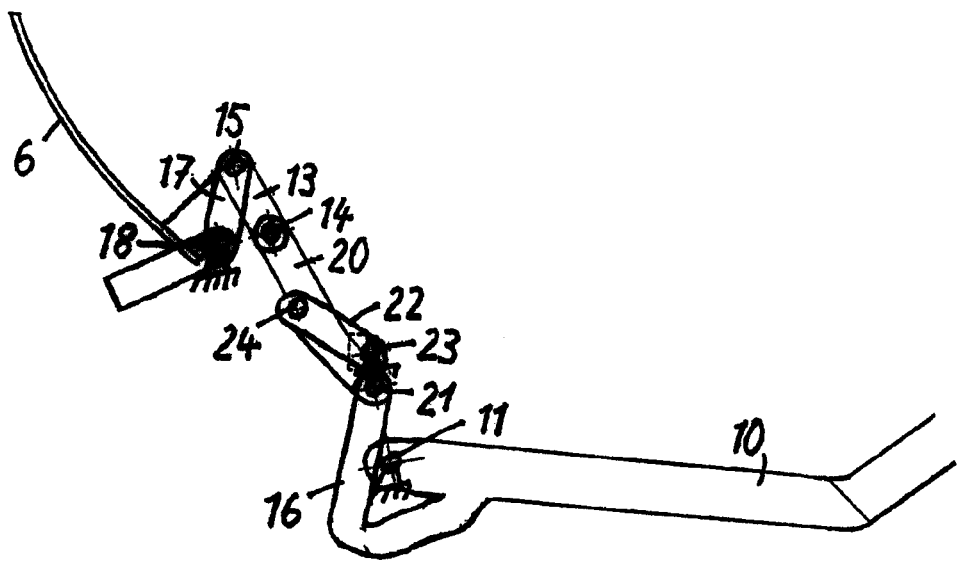
Figure 12:
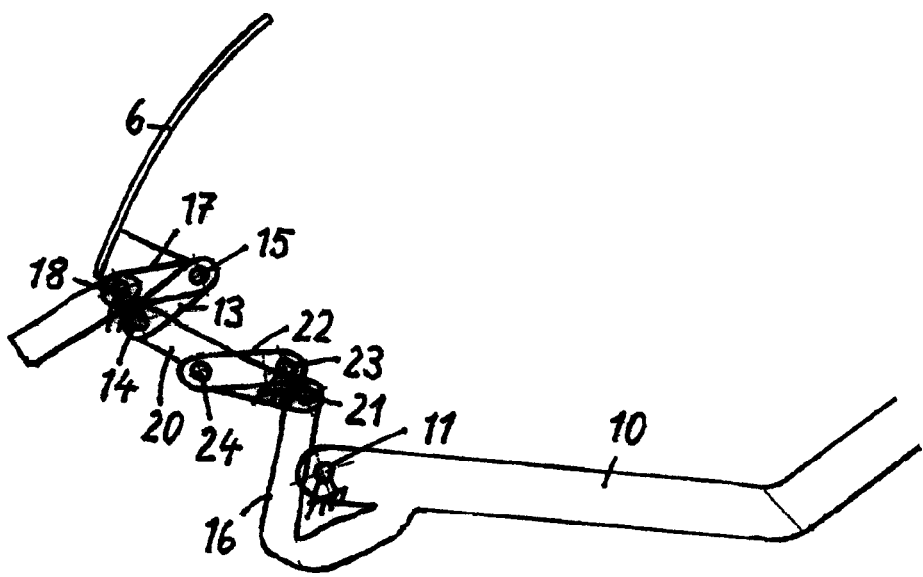

During the storage movement of roof 2, coupling kinematic system 12 passes through a dead-center or lined-up position (shown in FIG. 11). In the lined-up position, joints 14, 15 at the ends of connecting link 13 lie in a common line with joint 21 between coupling link 20 and main link projection 16. This lined-up position simultaneously characterizes the position in which cover 6 is swung the furthest upward. If main link 10 swings further about its vehicle body-side joint 11 in the direction of the storage position, then coupling kinematic system 12 crosses the lined-up position and cover 6 is pivoted back in the direction of its original horizontal starting position (shown in FIG. 13). This end position of cover 6 corresponds to that of the starting position when roof 2 is closed, but can slightly deviate from it and lie above or below the starting position as described with reference to FIGS. 6, 7, and 8.

Also in this embodiment, vehicle body-side joint 18 of cover 6 lies above vehicle body-side joint 11 of main link 10 and further forward when viewed in the forward direction of vehicle 1.

Figure 14:
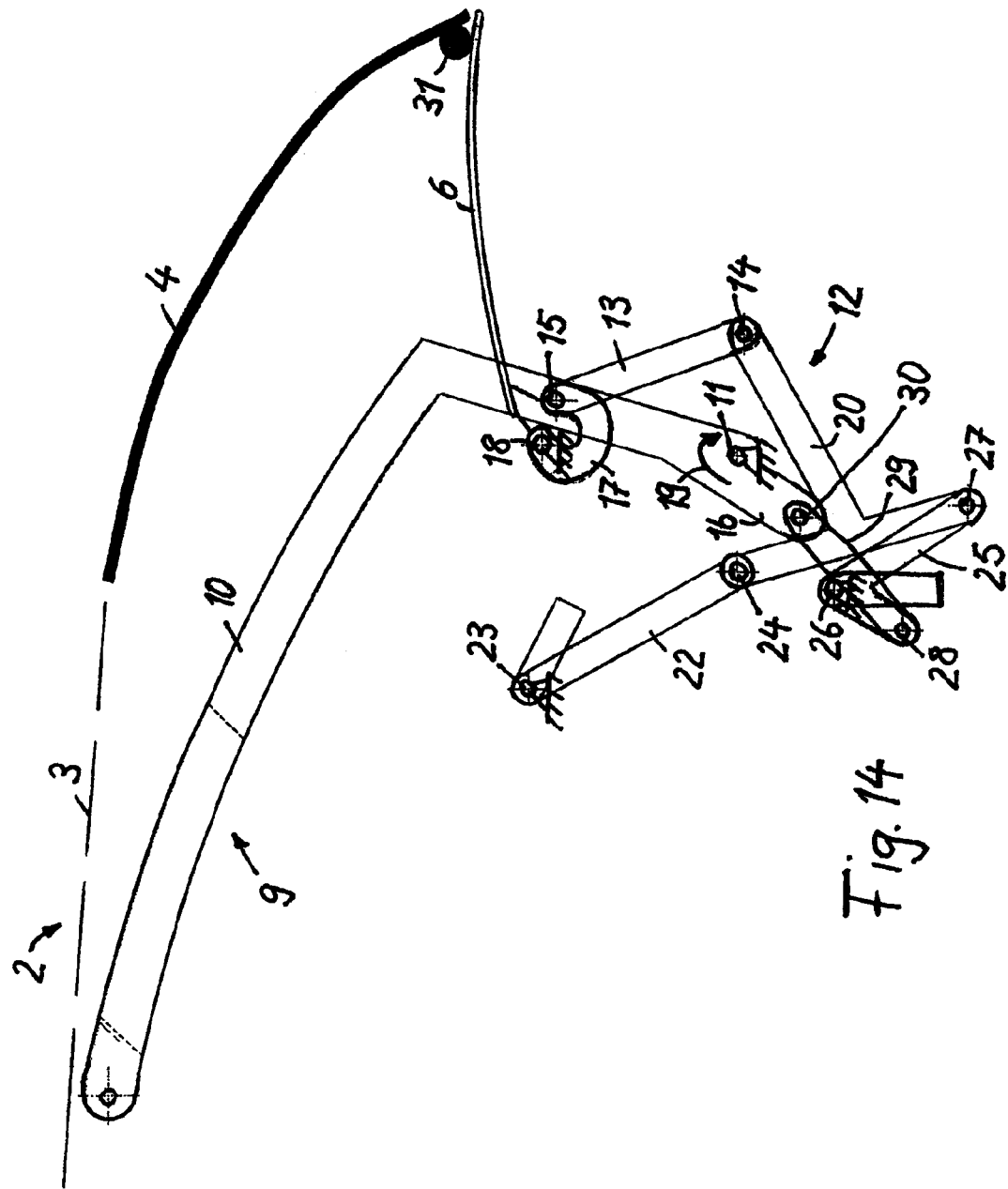
FIGS. 14, 15, 16, 17, 18, and 19 illustrate side views of the roof having another embodiment of the coupling kinematic system in accordance with the present invention shown between the closed position of the roof (shown in FIG. 14) and the storage position of the roof (shown in FIG. 19).
Figure 18:
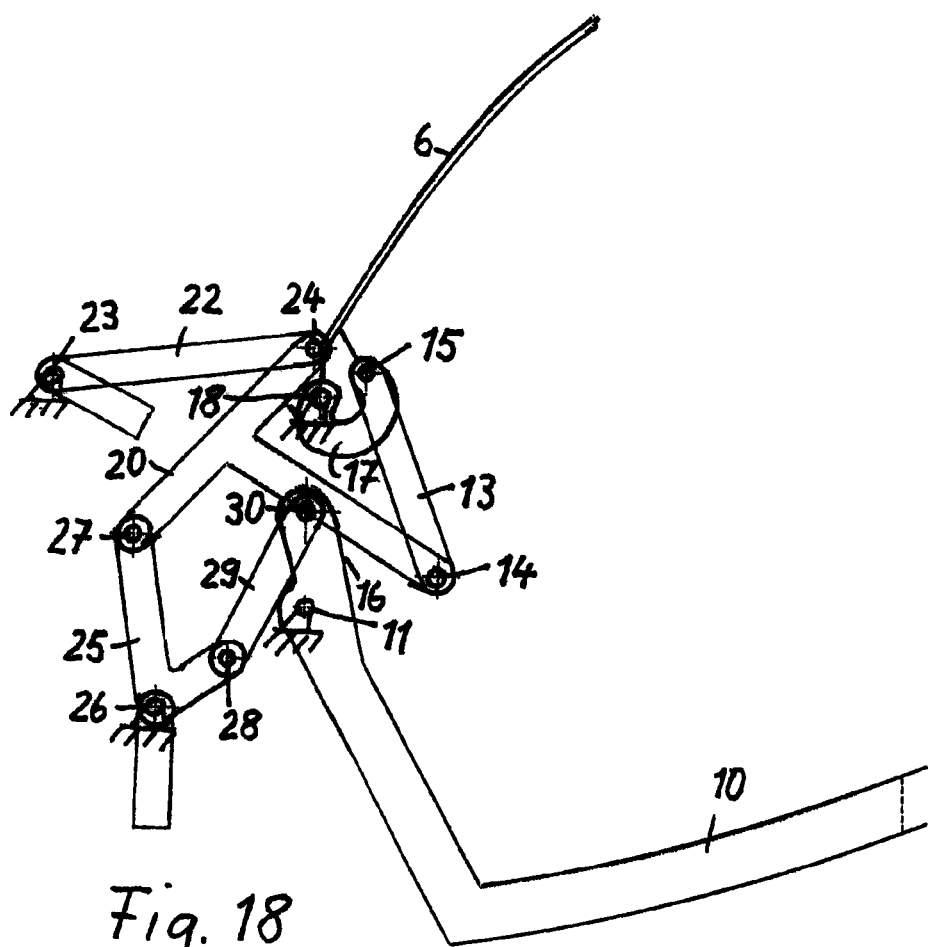
Figure 19:
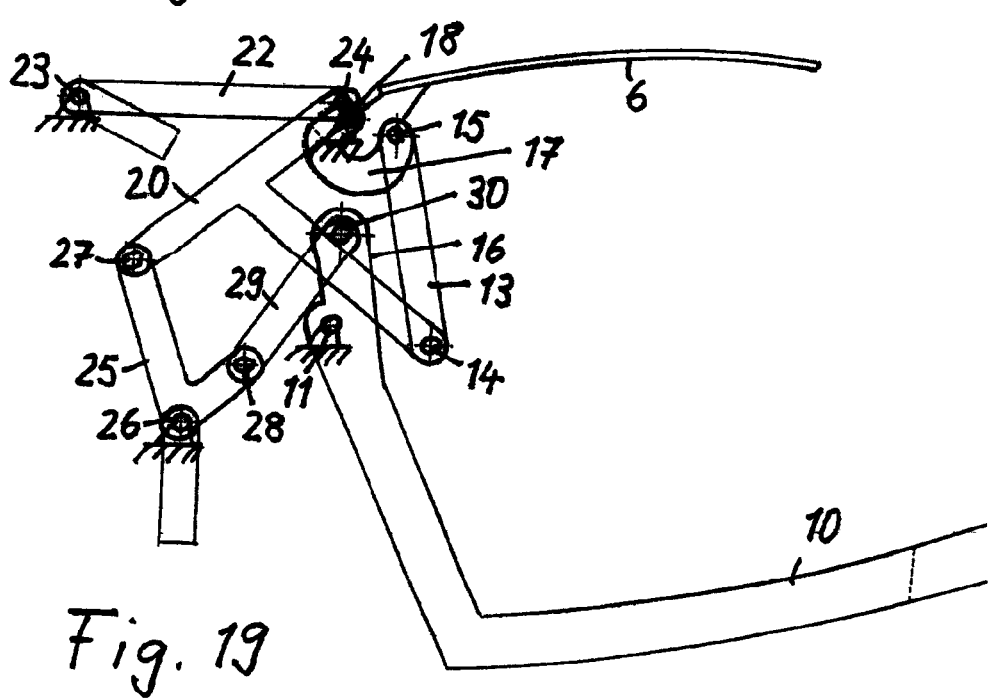

Referring now to FIGS. 14, 15, 16, 17, 18, and 19, side views of roof 2 having another embodiment of coupling kinematic system 12 through which the movement of main link 10 of roof kinematic system 9 is transferred to cover 6 in accordance with the present invention are shown. FIG. 14 illustrates roof kinematic system 9, coupling kinematic system 12, and cover kinematic system 17 when roof 2 is in its closed position. FIG. 19 illustrates kinematic systems 9, 12, and 17 when roof 2 is in its storage position.

Roof kinematic system 9 with main link 10 that can swing about vehicle body-side joint 11 holds roof 2 with roof parts 3, 4. In the closed position of roof 2 (shown in FIG. 14), the approximately horizontal cover 6 extends directly beneath rear roof part 4 to its lower edge. A sealing element 31 is on the inside along the lower edge of rear roof part 4 to provide a wind-tight and watertight seal against cover 6.

Cover 6 can swing about vehicle body-side joint 18. Coupling kinematic system 12 kinematically couples the rotating movements of main link 10 and cover 6. During the storage movement of roof 2, main link 10 swings about vehicle body-side joint 11, as shown by the direction of arrow 19. At the same time cover 6, which is attached to cover link 17, swings in the opposite direction about vehicle body-side joint 18. Coupling kinematic system 12 includes, in addition to connecting link 13, which acts in a swiveling manner on cover link 17 through joint 15, first coupling link 20, a first support link 22, a second coupling link 29, and a second support link 25. First and second support links 22, 25 are supported on the vehicle body.

The end of connecting link 13 remote from cover link 17 is connected through joint 14 with first coupling link 20. First coupling link 20 is T-shaped in this embodiment. Joint 14 to connecting link 13 is located on the middle section of the T. First coupling link 20 has on its transverse section two other joints 24 and 27. Joint 24 is rotatably coupled to first support link 22. In turn, first support link 22 is supported through body-side joint 23. The opposite joint 27 is rotatably coupled to second support link 25. In turn, second support link 25 is supported on the vehicle body through a vehicle body-side joint 26. Second support link 25 has an acute angle with vehicle body-side joint 26 being located in the middle section of second support link 25. Opposite joint 27, through which the connection is made with first coupling link 20, second support link 25 makes a rotating connection with second coupling link 29 through another joint 28. The end of second coupling link 29 remote from second support link 25 makes a rotating connection with main link projection 10 through another joint 30. This joint 30 is separated from vehicle body-side joint 11 of main link 10.

Figure 15:
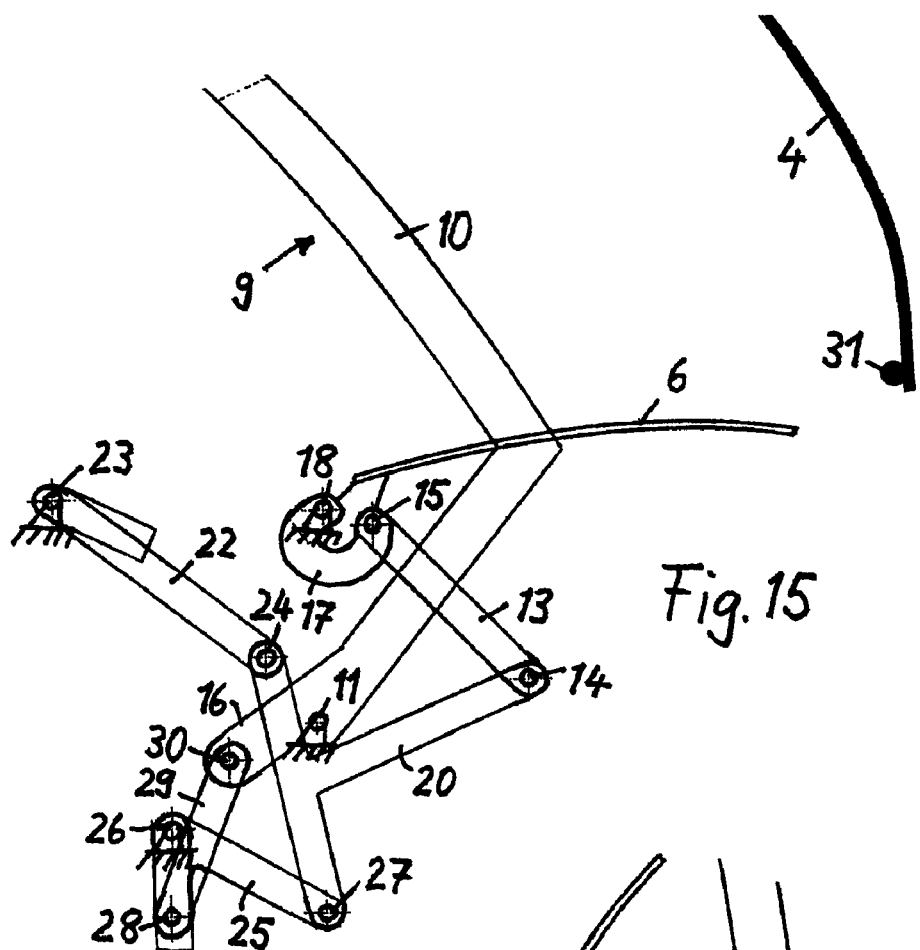
Figure 16:
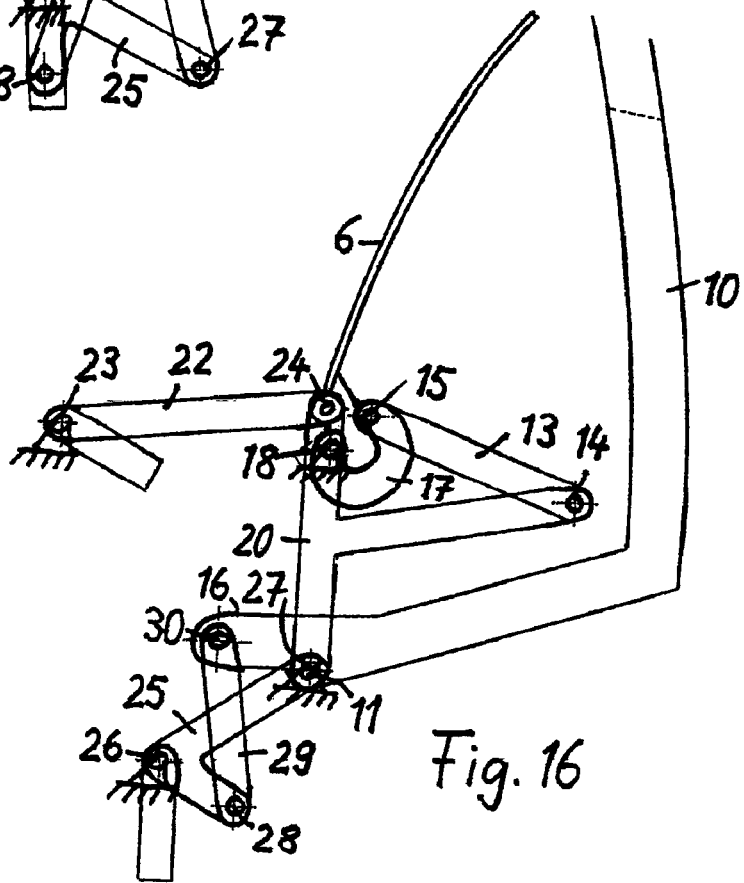
Figure 17:
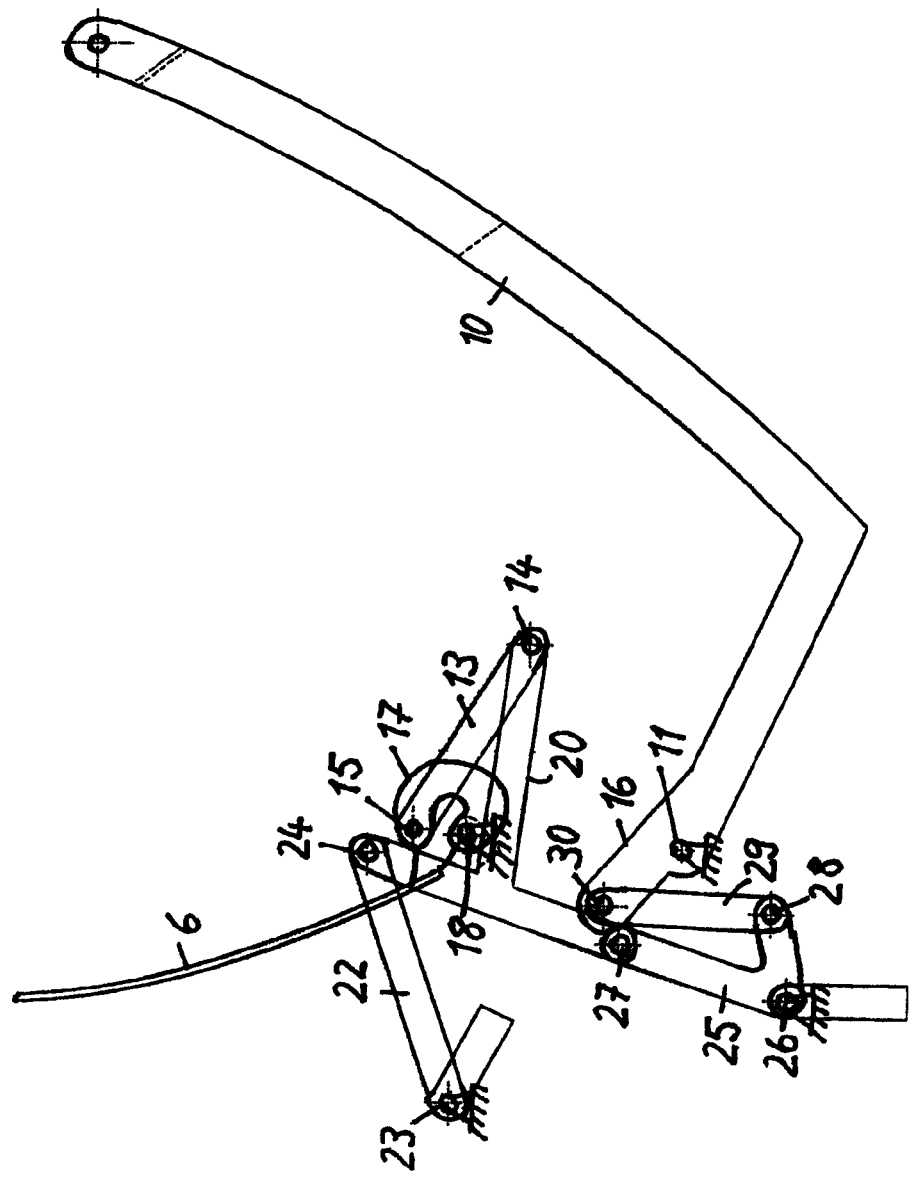

The two vehicle body-side joints 23 and 26 on first and second support links 22 and 25, respectively, when taken together with joints 24 and 27 of coupling link 20 that lies between them and connects them form a four-bar mechanism. Main link 10 drives the four-bar mechanism through second coupling link 29. An advantage of this embodiment is that joint 14, through which the middle section of first coupling link 20 makes a rotating connection with first connecting link 13, at first, during the initial storage movement of roof 2, describes a rotation about the opposite joint 15, through which first connecting link 13 makes a rotating connection to cover link 17, so that during this initial storage movement of roof 2 at first there is no transfer of motion to cover link 17 despite the movement of coupling kinematic system 12 and cover 6 remains in its starting position at first. This situation is shown in FIG. 15.

During the course of further roof storage movement shown in FIGS. 16, 17, 18, and 19, the movement starts to be effectively transferred through coupling kinematic system 12 to cover 6 so that cover 6 is swung up about its vehicle body-side joint 18 in the opposite direction to the storage movement of main link 10. In the maximally swung-up position (shown in FIG. 17) coupling kinematic system 12 reaches a lined-up or dead-center position. In this dead-center position, joints 24, 27 of first coupling link 20, which connect first coupling link 20 to first support link 22 and second support link 25, line up with vehicle body-side joint 26 of second support link 25. When this lined-up position is passed, the movement of cover 6 is reversed and cover now moves in the same direction as main link 10 as shown in FIGS. 18 and 19 back in the direction of its starting position. As soon as roof 2, including roof kinematic system 9, has reached the storage position (FIG. 19), cover 6 also reaches its at least approximately horizontal final position, which coincides with or slightly deviates from its starting position when roof 2 is closed so that a final position above or below the starting position is also possible.

LIST OF REFERENCE NUMBERS

1 Convertible vehicle
2 Vehicle roof
3 Front roof part
4 Rear roof part
5 Rear window
6 Cover
7 Windshield frame
8 Storage compartment
9 Roof kinematic system
10 Main link
11 Vehicle body-side joint
12 Coupling kinematic system
13 Connecting link
14 Joint
15 Joint
16 Projection
17 Cover link
18 Vehicle body-side joint
19 Arrow direction
20 Coupling link
21 Joint
22 Support link
23 Body-side joint
24 Joint
25 Second support link
26 Vehicle body-side joint
27 Joint
28 Joint
29 Second coupling link
30 Joint
31 Sealing element While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A vehicle comprising:
    a compartment;
    a roof having a plurality of roof parts, the roof being movable between a closed position in which the roof parts extend over the vehicle interior and a storage position in which the roof parts are stored within the compartment;
    a roof kinematic system having a main link movably coupled to the vehicle body via a vehicle body-side joint and connected to at least one of the roof parts to move the roof between the closed and storage roof positions;
    a cover movable between a closed position in which the cover covers the compartment and an opened position in which the cover is raised from the compartment;
    a cover link movably coupled to the vehicle body via a vehicle body-side joint and connected to the cover to move the cover between the closed and opened cover positions; and
    a coupling kinematic system having a connecting link coupling the main link of the roof kinematic system to the cover link such that the cover is coupled to the roof kinematic system to move about the vehicle body-side joint of the cover link as the roof moves between the closed and storage roof positions, wherein the connecting link passes through a lined-up position in which the connecting link and the vehicle body-side joints of the main link and the cover link run along a straight line during movement of the roof between the closed and storage roof positions.

2. The vehicle of claim 1 wherein:
one end of the connecting link is rotatably connected to the cover and the other end of the connecting link is rotatably connected to the roof kinematic system.

3. The vehicle of claim 1 wherein:
the coupling kinematic system further includes a coupling link, wherein one end of the coupling link is rotatably connected to the connecting link and the other end of the coupling link is rotatably connected to the roof kinematic system.

4. The vehicle of claim 3 wherein:
the coupling link is movably connected to the vehicle body via a vehicle body-side joint.

5. The vehicle of claim 4 wherein:
the coupling kinematic system further includes a support link;
wherein the vehicle body-side joint of the coupling link is arranged on one end of the support link and the other end of the support link is rotatably connected to the coupling link.

6. The vehicle of claim 4 wherein:
the vehicle body-side joint of the coupling link is located directly on the coupling link.

7. The vehicle of claim 1 wherein:
the connecting link of the coupling kinematic system is coupled directly to the roof kinematic system.

8. The vehicle of claim 1 wherein:
the vehicle body-side joint of the cover link is vertically arranged above the vehicle body-side joint of the roof kinematic system.

9. The vehicle of claim 1 wherein:
the vehicle body-side joint of the cover link is arranged in front of the vehicle body-side joint of the roof kinematic system along forward travel direction of the vehicle.

10. The vehicle of claim 1 wherein:
as the roof moves between the closed and storage roof positions, the main link of the roof kinematic system and the cover execute movements in opposite directions until the coupling kinematic system reaches the lined-up position and after the lined-up position is crossed the main link and the cover execute movements in the same direction.

11. The vehicle of claim 1 wherein:
the vehicle body-side joint of the cover link is arranged in front of the vehicle body-side joint of the roof kinematic system along forward travel direction of the vehicle.

* * * * *